(12) United States Patent
Morita

(10) Patent No.: US 7,221,469 B2
(45) Date of Patent: May 22, 2007

(54) IMAGE COMMUNICATION AND PROCESSING WITH COMMON PERFORMANCE OF PROCESSING OF A FILE PREPARATORY TO FURTHER PROCESSING BY DIFFERENT APPLICATIONS

(75) Inventor: Hiroyasu Morita, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 765 days.

(21) Appl. No.: 10/156,123

(22) Filed: May 29, 2002

(65) Prior Publication Data

US 2002/0181004 A1   Dec. 5, 2002

(30) Foreign Application Priority Data

Jun. 4, 2001  (JP)  .............................. 2001-168076
May 15, 2002 (JP)  .............................. 2002-140115

(51) Int. Cl.
*G06F 3/12* (2006.01)
(52) U.S. Cl. ..................... 358/1.15; 358/1.13; 358/402; 358/404
(58) Field of Classification Search ............... 358/1.15, 358/1.13, 404, 402
See application file for complete search history.

(56) References Cited

U.S. PATENT DOCUMENTS

| | | | |
|---|---|---|---|
| 5,953,505 A * | 9/1999 | Chida | 709/228 |
| 5,991,050 A | 11/1999 | Mathur et al. | 358/400 |
| 6,124,939 A | 9/2000 | Toyoda et al. | 358/1.15 |
| 6,211,972 B1 * | 4/2001 | Okutomi et al. | 358/402 |
| 6,288,799 B1 | 9/2001 | Sekiguchi | 358/468 |
| 2001/0013946 A1 | 8/2001 | Fujiwara | 358/1.15 |

FOREIGN PATENT DOCUMENTS

| | | |
|---|---|---|
| EP | 0 949 797 A2 | 10/1999 |
| EP | 949797 A2 * | 10/1999 |
| EP | 1 022 894 A2 | 7/2000 |
| EP | 1022894 A2 * | 7/2000 |
| JP | 55-045242 A | 3/1980 |
| JP | 60-000160 A | 1/1985 |
| JP | 04-079543 A | 3/1992 |
| JP | 7-288631 | 10/1995 |
| JP | 07288631 A * | 10/1995 |
| JP | 9-163064 | 6/1997 |
| JP | 10-107980 A | 4/1998 |
| JP | 11-41435 | 2/1999 |
| JP | 2001-007972 A | 1/2001 |
| JP | 2001-24868 | 1/2001 |
| KR | 1999-0072144 | 9/1999 |

OTHER PUBLICATIONS

Office Action issued Jan. 9, 2007 for corresponding Japanese Patent Appln. No. 2002-140115.

* cited by examiner

*Primary Examiner*—Douglas Q. Tran
*Assistant Examiner*—Andrew Lam
(74) *Attorney, Agent, or Firm*—Fitzpatrick, Cella, Harper & Scinto

(57) ABSTRACT

In a case where a conversion result image corresponding to a former image has been stored in a memory, control is performed to transmit this conversion result image without performing any image conversion process on the former image.

7 Claims, 10 Drawing Sheets

FIG. 5A

JOB INFORMATION

- TRANSMISSION JOB INFORMATION
- FORMER IMAGE INFORMATION
- CONVERSION PARAMETER
- CONVERSION JOB ID
- CONVERSION RESULT IMAGE INFORMATION
- THE NUMBER OF ACTUAL REFERENCES

FIG. 5B

CACHE INFORMATION TABLE

| JOB INFORMATION DOCUMENT INFORMATION THE NUMBER OF REFERENCES | JOB INFORMATION | JOB INFORMATION | | JOB INFORMATION |

DELETE AT A TIME OF CACHE OUT

FIG. 5C

EXAMPLE OF JOB INFORMATION

| TRANSMISSION JOB INFORMATION | RECEPTION NO. =72 |
|---|---|
| FORMER IMAGE INFORMATION | FOLDER ID=120, DOCUMENT ID=4, PAGE ID=1 |
| CONVERSION PARAMETER | MMR COMPRESSION, +120% ENLARGEMENT, +270° ROTATION |
| CONVERSION JOB ID | IMAGE CONVERSION ID =80030200 |
| CONVERSION RESULT IMAGE INFORMATION | FOLDER ID=110, DOCUMENT ID=1, PAGE ID=1 |
| THE NUMBER OF ACTUAL REFERENCES | THE NUMBER OF ACTUAL REFERENCES =1 |

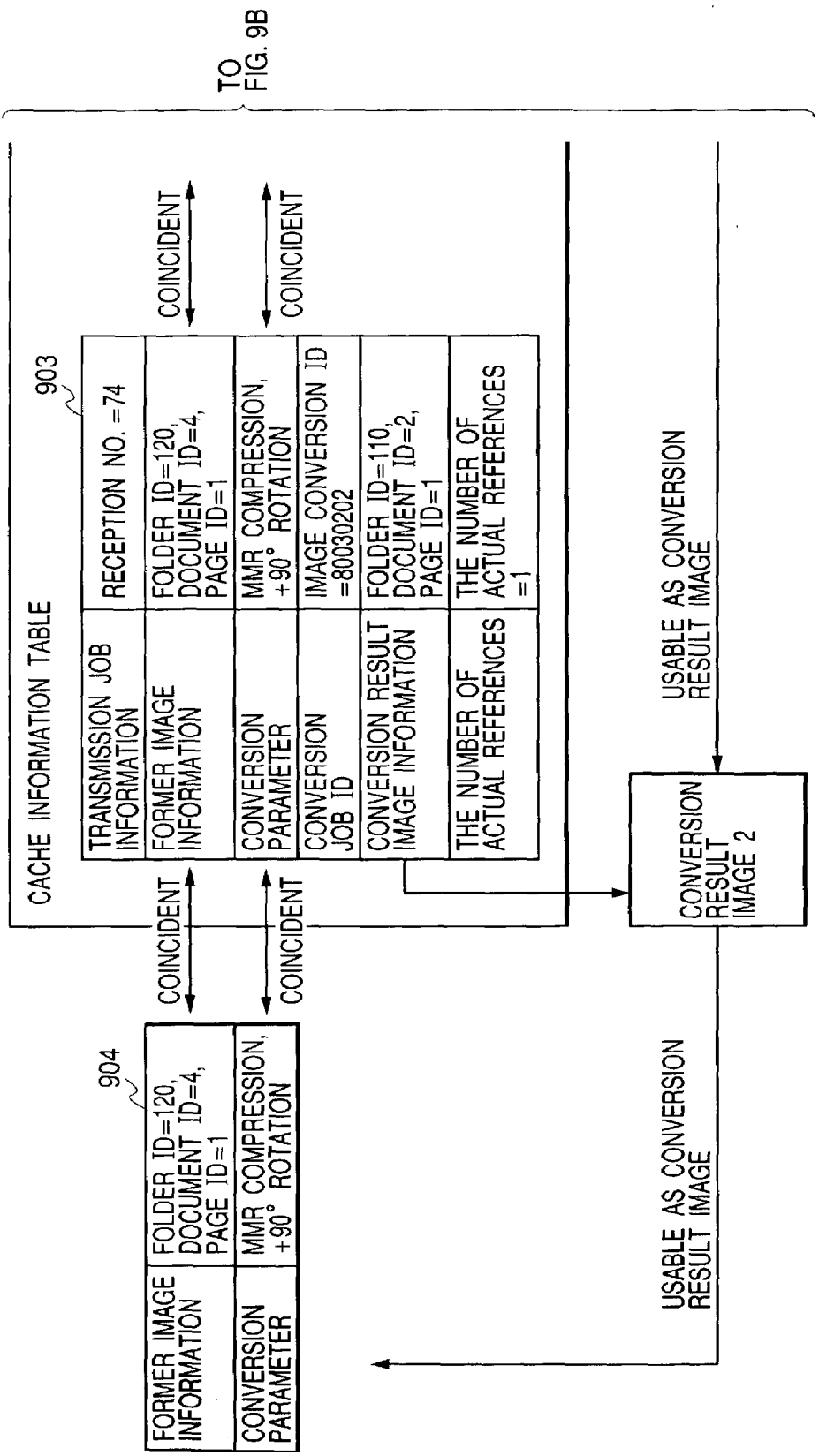

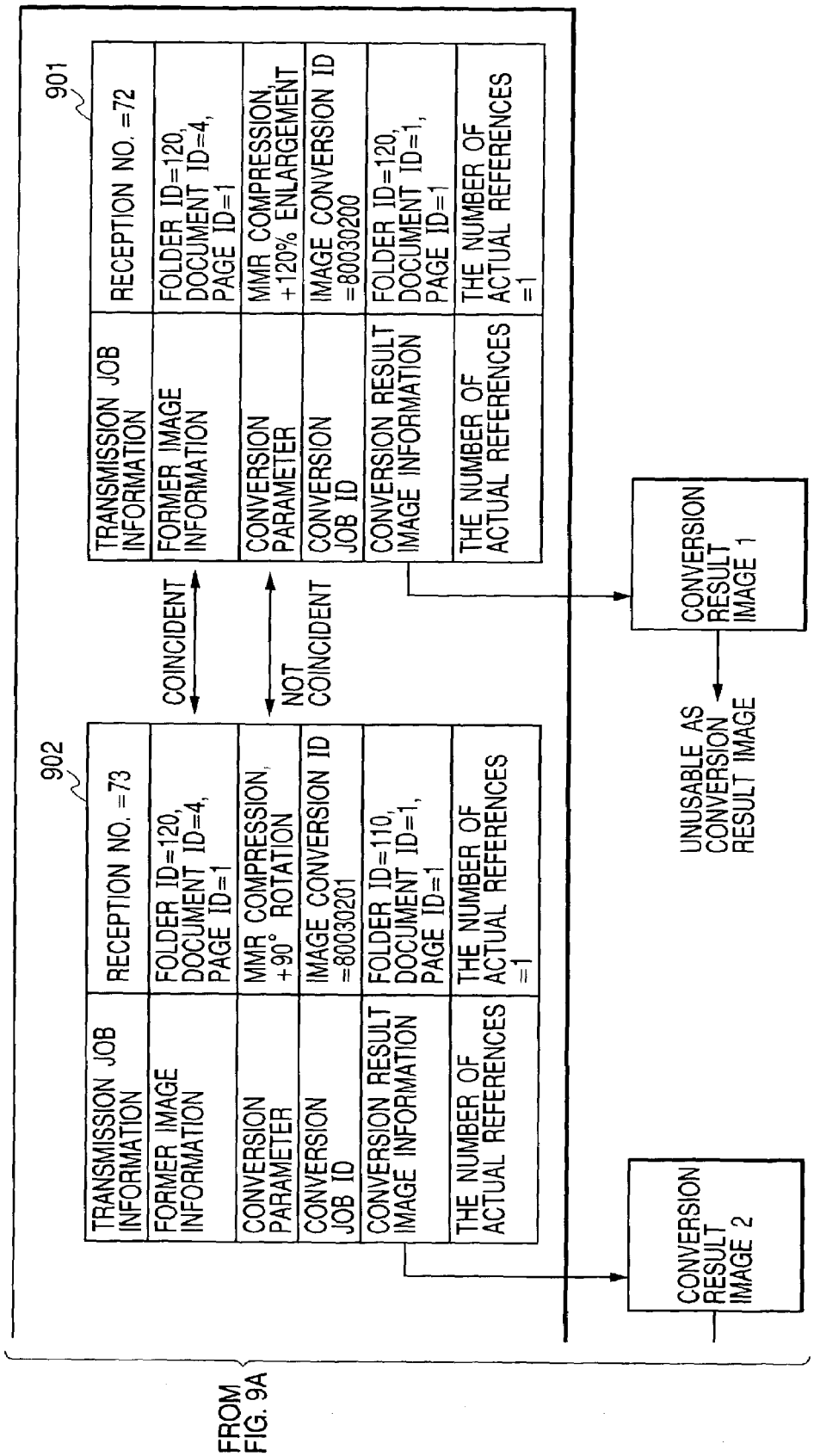

IMAGE COMMUNICATION AND PROCESSING WITH COMMON PERFORMANCE OF PROCESSING OF A FILE PREPARATORY TO FURTHER PROCESSING BY DIFFERENT APPLICATIONS

BACKGROUND OF THE INVENTION

1. Field of the Invention

The present invention relates to an image communication apparatus, an image processing apparatus, an image communication method and an image processing method which perform a predetermined conversion process to an input image and then output the conversion-processed image, and to programs which execute those methods.

2. Related Background Art

In recent years, an image processing apparatus which has various image input/output functions such as a scanner function, a printer function, a copying function, a fax function and the like is known. Moreover, an image processing system in which such an image processing apparatus, an image processing apparatus of another kind, and a host computer such as a PC (personal computer) or the like are connected to others through a network is known. In such an image processing system, an image input by the image input function of one image processing apparatus can be output to another apparatus on this system. Further, when the image is output, the image to be output is subjected to an image conversion process by using an image conversion function provided in the image processing apparatus, and then the image obtained by the image conversion process can be output.

As an example of the image processing apparatus, a digital multifunctional device (simply called a "multifunctional device" hereinafter) is given. Here, the multifunctional device has a function to transmit or print an image obtained by reading an original with a scanner or an image externally received. When the multifunctional device executes this function, the original image is subjected to the conversion process by using the image conversion function, and then the image obtained by the conversion process can be transmitted or printed.

The above operation is controlled by a controller of the multifunctional device. For example, when the above image transmission is performed, a CPU (central processing unit) provided in the controller executes a transmission application. Further, when the above printing is performed, the CPU executes a copying (printing) application.

Moreover, when a document read by the scanner is transmitted, the CPU performs a conversion process concerning the number of pixels, resolution, a direction and the like on the read document, whereby the image suitable for a transmission destination can be transmitted. At this time, the CPU executes the transmission application and controls the scanner, a hard disk, a transmission I/F (interface) and the like. Meanwhile, the CPU controls the conversion process by using image processing hardware, a memory and the like. This conversion process is performed with respect to each page, and the image of the page which has been transmitted and is thus no longer necessary is cancelled from the disk.

In recent years, a digital multifunctional device which includes plural transmission applications has been proposed. In this digital multifunctional device, each transmission application performs an image conversion process, with respect to each page, on an image to be transmitted, and then performs the transmission of the processed image. For example, one transmission application may perform the image transmission by electronic mail, and another transmission application may perform file transfer on the basis of the standard file transfer protocol (FTP).

However, when one image is transmitted by using plural transmission applications, there is a case where an identical image conversion process is to be performed on the one image and the processed image is transmitted in accordance with a combination of these transmission applications, for example, a case where the identical former image is transmitted to plural destinations respectively by using several different transmission applications. Here, each transmission application performs the image conversion process, the transmission of the converted image, and the cancellation of the unnecessary image independently of the other transmission applications. For this reason, even if the identical former image is transmitted to plural destinations by means of plural transmission applications, each transmission application performs the same image conversion on all the pages of the identical former image. This means that the same image conversion process is redundantly performed plural times, resulting in the wasteful use of CPU resources.

SUMMARY OF THE INVENTION

The present invention has been brought to completion to solve the conventional problem as described above, and, an object thereof is to provide an image communication apparatus which can effectively use CPU resources so that performance of an image transmission process improves, an image communication method which is applicable to the above image communication apparatus, and a program to execute the above image communication method.

As one means to achieve the above object, there is provided an image communication apparatus that comprises storage means for storing an image, conversion means for performing a predetermined conversion process on an input former image, and transmission means for transmitting a conversion result image obtained by the conversion means to a plurality of destinations. Also provided are judgment means for judging, after the conversion for at least one of the destinations has been performed, whether or not the conversion result image corresponding to the former image which has been stored in the storage means is usable for another of the plural destinations. In addition, control means are provided for, in a case where it is judged that the conversion result image corresponding to the former image which is usable for the other destination has been stored in the storage means, controlling the conversion means and the transmission means to transmit the corresponding conversion result image stored in the storage means without performing the conversion process on the former image, for transmission to that other destination.

Another object of the present invention is to provide an image communication apparatus which can effectively use CPU resources so that performance of a broadcast transmission process (i.e., a multicasting process) improves, an image communication method which is applicable to the above image communication apparatus, and a program which is to execute the above image communication method.

As one means to achieve the above object, there is provided an image communication apparatus that comprises storage means for storing an image, conversion means for performing a predetermined conversion process on an input former image, and plural transmission means each for transmitting a conversion result image obtained by the conversion means to a predetermined destination. Also provided are judgment means for judging, in a case of performing broadcast transmission of the image to the plural destinations by using the plural transmission means, whether or not the conversion result image for one destination is usable for another of the plural destinations. Control means, in a case where it is judged that the conversion result image for one destination is usable for that other destination, control the conversion means and each of the transmission means to transmit the conversion result image for the one destination stored in the storage means to that other destination too.

The present invention has been brought to completion to solve the conventional problem as described above, and, an object thereof is to provide an image processing apparatus which can effectively use CPU resources so that performance of an image output process improves, an image processing method which is applicable to the above image processing apparatus, and a program which is to execute the above image processing method.

As one means to achieve the above object, there is provided an image processing apparatus which includes conversion means for performing a predetermined conversion process on an input former image and outputting a conversion result image obtained by the conversion process. The apparatus comprises first storage means for storing the conversion result image, output control means for outputting the corresponding conversion result image, and determination means for determining the number of references to each conversion result image stored in the first storage means in accordance with type of output destinations, the number of references being used for the image output by the output control means. Second storage means are provided for storing the number of references to each conversion result image stored in the first storage means as determined by the determining means and judging means judge whether or not the conversion result image is to be referenced in accordance with the type of the output destinations. Also provided are control means for controlling the conversion means, first storage means and output control means such that the output control means output the corresponding conversion result image stored in the first storage means without performing the conversion process on the former image in accordance with the determined number of references in a case where it is judged that the conversion result is to be referenced, and output the corresponding conversion result image obtained from the conversion means in a case where it is judged that the conversion result image is not to be referenced.

The present invention has been brought to completion to solve the conventional problem as described above, and, an object thereof is to provide an image processing apparatus which can effectively use CPU resources and storage areas so that performance of an image output process improves, an image processing method which is applicable to the above image processing apparatus, and a program which is to execute the above image processing method.

Methods corresponding to the function of the mentioned apparatuses, and programs for executing those methods, are also within the scope of the invention.

The above objects of the present invention will be apparent from the following drawings and the detailed explanation based on these drawings.

BRIEF DESCRIPTION OF THE DRAWINGS

FIGS. 5A, 5B and 5C are diagrams showing an example of a cache information table to be stored in storage device 109;

FIG. 9 which is composed of FIGS. 9A and 9B is a diagram showing a state of a cache information table according to the second embodiment of the present invention.

DETAILED DESCRIPTION OF THE PREFERRED EMBODIMENTS

Hereinafter, the embodiments of the present invention will be explained in detail with reference to the attached drawings.

First Embodiment

Figure 1:
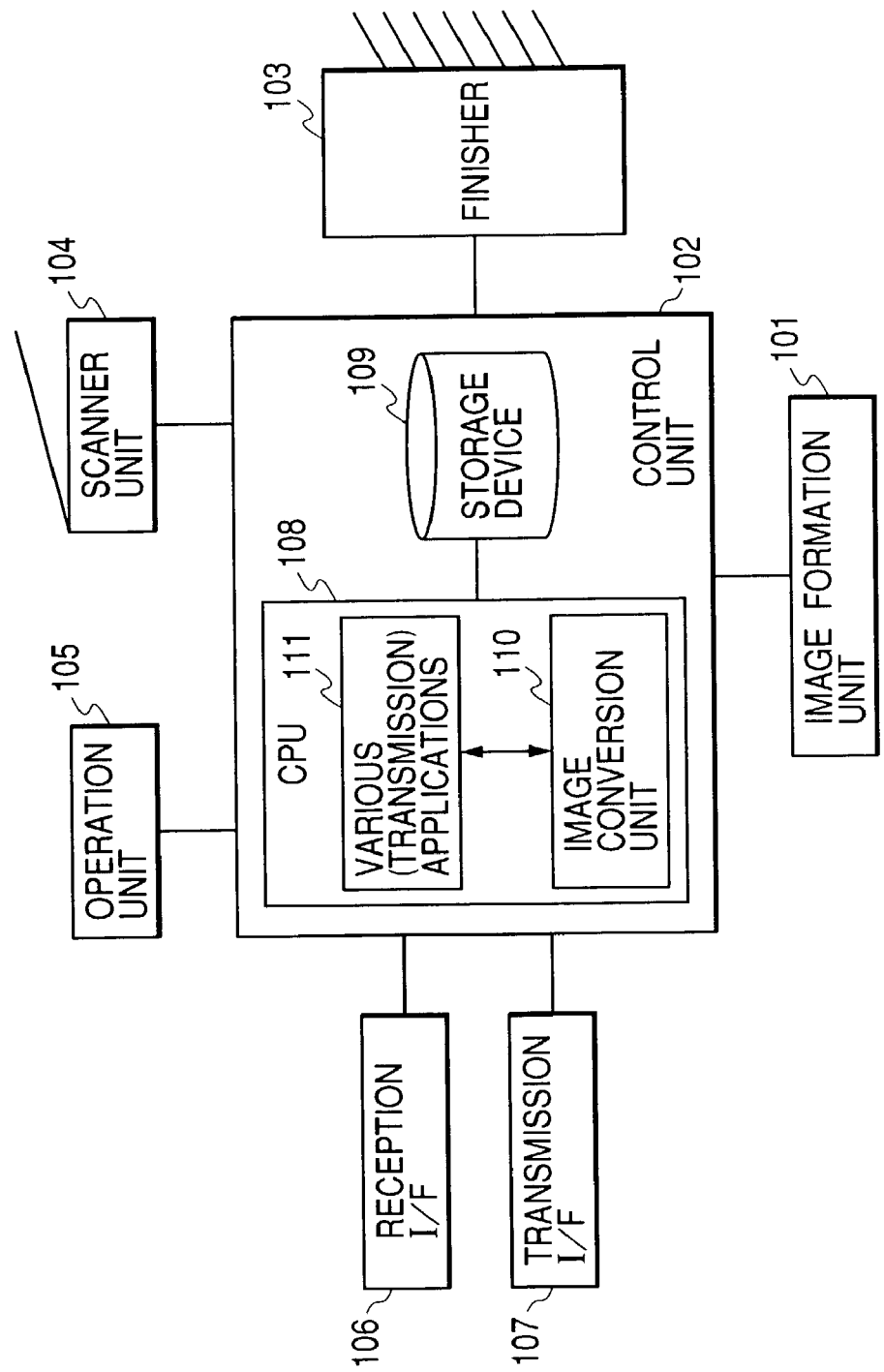
FIG. 1 is a block diagram showing a structure of a digital multifunctional device to which the present invention is applicable.

FIG. 1 is a block diagram showing a structure of a digital multifunctional device (simply called a "multifunctional device" hereinafter) to which the present invention is applicable.

The multifunctional device according to the present invention is composed of an image formation unit 101, a control unit (or controller) 102, a finisher 103, a scanner unit 104, an operation unit 105, a reception I/F 106, and a transmission I/F 107, and each of the components 101, 103, 104, 105, 106 and 107 is connected to the control unit 102 through a dedicated interface.

The image formation unit 101 forms an image on a recording medium on the basis of image data sent from the control unit 102. Here, although an electrophotographic system is applied as an image formation system in the present embodiment, the present invention is not limited to this. That is, it is needless to say that the present invention is also applicable to other systems such as an ink-jet system and the like.

The control unit 102 controls various operations of the components 101 and 103 to 107 of the multifunctional device. Moreover, the control unit 102 performs an image input process, an image output process and an image conversion process. Here, it should be noted that the main portion of the control unit 102 is composed of a CPU 108, a storage device 109 and an image conversion unit 110.

The finisher 103 performs a postprocess (i.e., a process to be performed after such an image data process as above) such as a stapling process and the like on the recording medium output from the image formation unit 101. Here, setting and control of the postprocess are performed by the control unit 102.

The scanner unit 104 optically reads an original image, and converts the read original image into an electrical signal to generate the image data. Moreover, as will be described later, the image data digitized by the scanner unit 104 and input to the control unit 102 can be transmitted to an external device through a network.

The operation unit 105 is provided with a not-shown LCD (liquid crystal display) on which a state of the multifunctional device, operation information and the like are displayed, and a not-shown operation panel by which an operator performs an input operation. Moreover, setting, instruction and the like in a case of performing later-described image transmission is performed on the operation unit 105.

The reception I/F 106 includes plural reception interfaces which are connected to a predetermined LAN (local area network) and a public line. In the present embodiment, at least one reception interface can receive images and various process requests from PC's on the LAN and other multifunctional devices. Similarly, at least one reception interface is connected to the public line to be able to receive a fax image from an arbitrary transmission source (i.e., fax image sender).

The transmission I/F 107 includes plural transmission interfaces which are connected to the predetermined LAN and the public line. In the present embodiment, at least one transmission interface can transmit images and various process requests to PC's on the LAN and other multifunctional devices. Similarly, at least one transmission interface is connected to the public line to be able to transmit a fax image to an arbitrary transmission destination.

The CPU 108 controls the image input process and the image output process by executing later-described various applications (software) 111. Moreover, the CPU 108 controls an image conversion process in the image conversion unit 110, access to the storage device 109, and the like. Moreover, the CPU 108 includes a dedicated storage area for executing programs, and the various applications 111 and the image conversion unit 110 exist on this dedicated storage area. For example, this dedicated storage area is secured on a RAM (random-access memory) or an HDD (hard disk drive) provided in the multifunctional device.

The storage device 109 stores a later-described cache information table and the image obtained after the image conversion was performed. For example, the storage device 109 is composed of the RAM, the HDD and the like provided in the multifunctional device.

The image conversion unit 110 transmits and receives information concerning the image conversion process to and from the various applications 111, and thus performs the image conversion process. The details of the image conversion unit 110 will be explained below.

Next, an image input/output processing function which can be executed by the multifunctional device according to the present embodiment will be explained.

(1) Image Transmission Function

This function is also called a Universal Send function. By using the image transmission function, the image read by the scanner unit 104 and the image stored in the storage device 109 are transmitted (sent) to the PC on the LAN and another digital multifunctional device through the transmission I/F 107. Moreover, the image read by the scanner unit 104 and the image stored in the storage device 109 are transmitted to another device which is connected to the public line and has a fax function, through a line connection unit included in the transmission I/F 107. Moreover, the image is attached to an electronic mail and thus transmitted to a mail server. Similarly, the image is transmitted to a fax machine by an Internet fax function which uses the electronic mail.

(2) Printer Function

By using the printer function, on the basis of a print request received from the PC or the like on the LAN through the reception I/F 106 or a print request input from the operation unit 105, an image corresponding to the obtained print request is formed.

(3) Copying Function

By using the copying function, an image input from the scanner unit 104 is actually formed by the image formation unit 101. Moreover, the image input from the scanner unit 104 is output to another digital multifunctional device connected on the LAN and an image output device such as a printer or the like, through the transmission I/F 107. At this time, an operation that the input image is output to one image output device is called remote copying, while an operation that the input image is output to plural image output devices is called cascade copying.

In the present embodiment, it is assumed that the CPU 108 can simultaneously execute the plural applications 111 for controlling the above functions, that is, the CPU 108 can simultaneously execute a transmission (image transmission function) application, a printing application, a copying application, and the like.

Next, the image conversion process in the present embodiment will be explained. The control unit 102 disposed between the above image input and output devices performs various image conversion processes to the input image and then outputs the converted image.

The control unit 102 includes the image conversion unit 110 which performs the image conversion process with respect to each page. The image conversion unit 110 in the present embodiment is provided with a resolution conversion unit for converting the resolution (i.e., the number of pixels) of the input image, a rotation unit for converting the direction of the input image, and an encoding unit for performing compression and decompression of the input image. Here, it should be noted that the image conversion process to which the present invention is applicable is not limited to this. That is, it is needless to say that the present invention is also applicable to other image conversion processes such as a binary/multivalue conversion process, a color conversion process, a file format conversion (e.g., TIFF (tagged image file format) conversion) process, and the like.

The image conversion unit 110 receives image conversion process requests from the various applications 111, performs the image conversion processes on the basis of the received image conversion process requests, and thereafter notifies the various applications 111 of the results of the respective image conversion processes.

Further, the image conversion unit 110 includes, as software, the resolution conversion unit, the rotation unit, and a communication unit for performing communication with each application. That is, the image conversion unit 110 performs coordinate conversion of bit-map data or the like by using the dedicated memory and the storage area of the storage device 109. However, the present invention is not limited to this, that is, the resolution conversion unit and the rotation unit may be structured as dedicated hardware components.

Moreover, the image conversion unit 110 performs the image conversion processes one by one in accordance with the order requested by the various applications 111. Then, after the image conversion unit 110 has notified each application 111 that the conversion result is "success", the latter application performs a predetermined image output operation concerning the converted image. For this reason, while the image conversion process based on one image conversion process request is being performed by the image conversion unit 110, the next image conversion process request (if any) is put in a standby state. Therefore, while the image conversion process based on one application is being performed, if a further image conversion process request is given based on another application, there may be a time necessary to wait for the image conversion process requested by the another application, whereby the performance of the image output operation may seriously deteriorate. However, by performing the image conversion process in accordance with a later-described procedure, it is possible to repress such deterioration of the performance of the image output operation.

Hereinafter, the image conversion process according to the present embodiment will be explained in detail by way of example of a case where the image transmission function is executed.

In the image transmission function, as described above, the operator sets the original to the scanner unit 104, or designates from the operation unit 105 a document or the like previously stored in the storage device 109. Then, the operator selects the transmission destination from the operation unit 105, and instructs the transmission of the set or designated image to the selected designation.

The transmission application (or send application) included in the various applications 111 generates a transmission job (or send job) in accordance with the operator's selection and instruction. Then, in case of transmitting the image, the transmission application requests the image conversion unit 110 to perform the image conversion process necessary to each job on the basis of the generated transmission job.

In the present embodiment, the image transmission function to be concretely executed includes a known electronic mail transmission function to attach the image to a mail and then transmit the mail attached with the image, and a file transfer function based on FTP. Therefore, the two conversion result images which have been obtained by performing the same image conversion process to the identical image can be transmitted to the same destination or the different destinations respectively by the electronic mail and the FTP transfer. At this time, the two transmission applications are being executed, that is, the image transmission by the electronic mail function is performed on the basis of one transmission application, while the file transfer according to FTP is performed on the basis of the other transmission application.

Moreover, as described above, the image conversion unit 110 can perform the image conversion process of only one request at a time. In this case, the application (e.g., the file transfer according to FTP) of which the transmission speed is higher first completes the image conversion process. Therefore, it is necessary for the application (e.g., the electronic mail transmission) of which the transmission speed is lower to wait for the image conversion process for a predetermined time.

Figure 2:
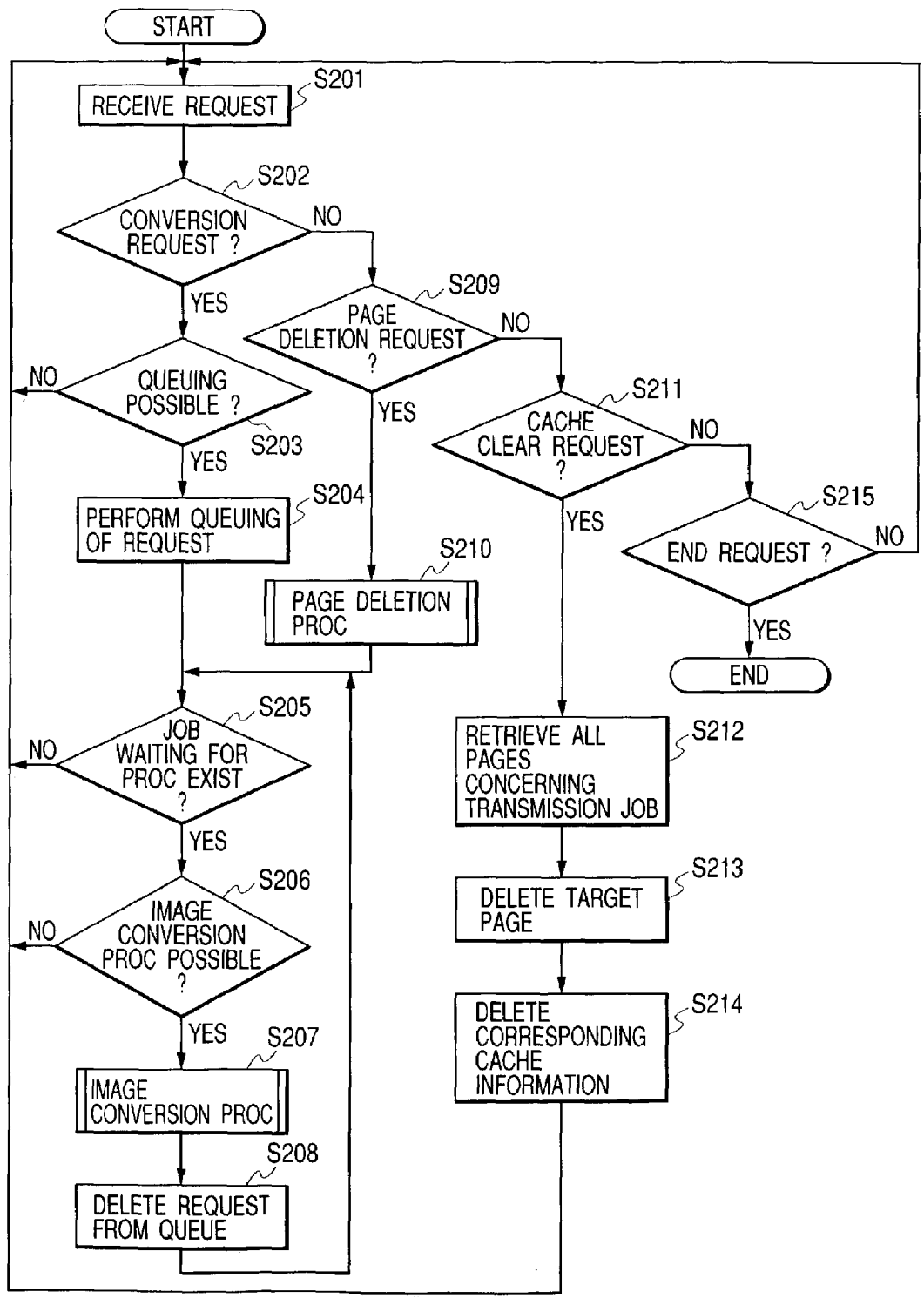
FIG. 2 is a flow chart showing a process of an image conversion unit 110 shown in FIG. 1.

FIG. 2 is a flow chart showing the process of the image conversion unit 110 according to the present embodiment. Here, it should be noted that the process procedure shown in FIG. 2 is controlled by the CPU 108, and the numerals shown in FIG. 2 indicate respective steps.

First, the process request based on the transmission application or the transmission job from the system is received (step S201), and then it is judged under the control of the CPU 108 whether or not the received request is the image conversion process request (step S202). Here, the image conversion process request in the present embodiment includes transmission job information, former image information (i.e., information representing an image before conversion), conversion parameters necessary to perform the process in the image conversion unit 110, a conversion job ID, and the like.

If the judged result is YES in step S202, then it is further judged whether or not queuing is possible to an image process job queue provided on the storage device 109 (step S203). If the judged result is YES in step S203, then the image conversion process request received in step S201 is added to the image process job queue (step S204). On the other hand, if the judged result is NO in step S203, the process comes to be in a new request waiting state and returns to step S201.

After the processing in step S204 ended, it is judged by the CPU 108 whether or not the job being in the process waiting state exists in the image process job queue (step S205). If the judged result is YES in step S205, then it is further judged under the control of the CPU 108 whether or not the image conversion process is possible (step S206). If the judged result is NO in step S205, the process comes to be in a new request waiting state and returns to step S201. Similarly, if the judged result is NO in step S206, the process comes to be in a new request waiting state and returns to step S201.

On the other hand, if the judged result is YES in step S206, the indicated former image is converted into the image described in the indicated conversion parameters under the control of the CPU 108 in accordance with the image conversion process request, and the conversion result is notified to the transmission application which is a process request source (step S207). Then, the job which was processed in step S207 is deleted from the image process job queue (step S208), and the process returns to step S205.

On the other hand, if the judged result is NO in step S202, then it is judged under the control of the CPU 108 whether or not the process request received in step S201 is a page deletion request (step S209). Here, it should be noted that the page deletion request is generated by the transmission application in accordance with the operator's image designation, and the page deletion request includes information to specify the image to be deleted. Then, if the judged result is YES in step S209, the page deletion process is performed (step S210), and the process advances to step S205.

On the other hand, if the judged result is NO in step S209, then it is judged under the control of the CPU 108 whether or not the process request received in step S201 is a cache clear request (step S211).

If the judged result is YES in step S211, then the pages to be deleted on the storage device 109 are all retrieved under the control of the CPU 108 (step S212), the target pages are deleted (step S213), and the cache information on the storage device 109 is deleted (step S214). After then, the process comes to be in a new request waiting state and returns to step S201.

On the other hand, if the judged result is NO in step S211, then it is judged under the control of the CPU 108 whether or not the process request received in step S201 is a process end request (step S215).

Then, if the judged result in step S215 is YES, the process ends, while if the judged result is NO, the process comes to be in a new request waiting state and returns to step S201.

Figure 3:
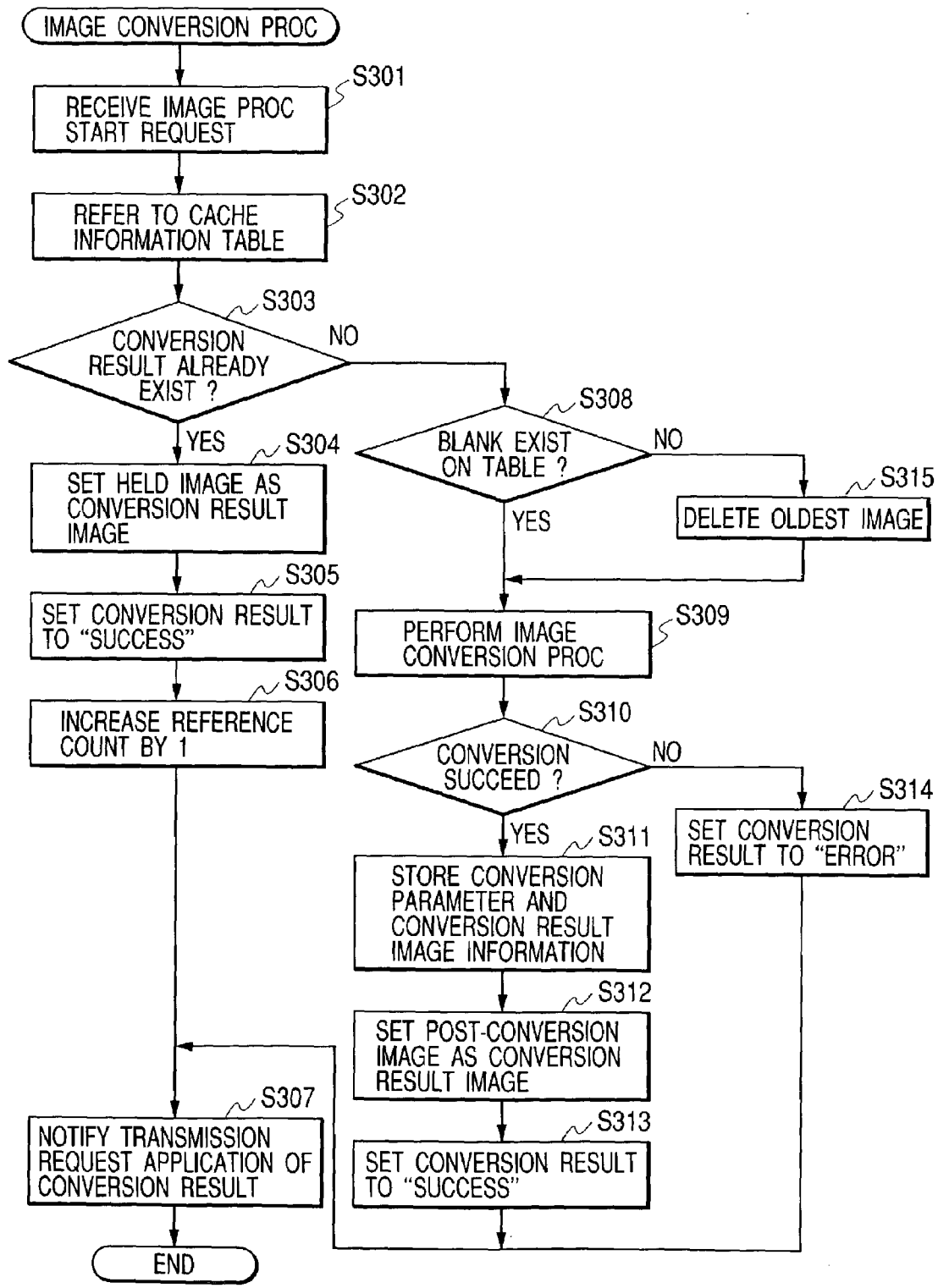
FIG. 3 is a flow chart showing in detail an image conversion process to be performed in step S207 of FIG. 2.

FIG. 3 is a flow chart showing in detail the image conversion process to be performed in the step S207 of FIG. 2. Here, it should be noted that the process procedure shown in FIG. 3 is controlled by the CPU 108, and the numerals shown in FIG. 3 indicate respective steps.

First, the image conversion process request to start the image conversion process is received from an image process conversion request source (step S301), and the cache information table provided on the storage device 109 is referred to (step S302). Subsequently, it is judged under the control of the CPU 108 whether or not job information including a combination of a former image and a conversion parameter indicated by the image conversion process request received in step S301 exists in the cache information table (step S303). In other words, it is judged in step S303 whether or not a conversion result image has been already held in the storage device 109.

If the judged result in step S303 is YES, the image corresponding to the result of the image conversion process based on the request received in step S301 and already held in the storage device 109 is set as the conversion result image of which the application of the image conversion process request source is to be notified (step S304). Moreover, the conversion result to be contained in the notification is set to "success" (step S305). Then, a reference counter of the corresponding image conversion process information on the cache information table is increased by one (step S306), this count is notified as the result to the transmission application from which the conversion process was requested (step S307), and then the process ends.

On the other hand, if the judged result in step S303 is NO, then, under the control of the CPU 108, the number of elements of the cache information table provided on the storage device 109 is compared with the number of prescriptions prescribed by the system to judge whether or not a blank exists in the cache information table (step S308).

If the judged result in step S308 is YES, then, under the control of the CPU 108, the conversion process designated by the image conversion parameters is performed to the former image in accordance with the image conversion process request received in step S301 (step S309).

After the process in step S309 ended, it is further judged under the control of the CPU 108 whether or not the conversion process in step S309 succeeded (step S310). If the judged result in step S310 is YES, the image conversion process request information received in step S301 and the conversion result image information obtained in step S309 are stored as job information in the cache information table provided on the storage device 109 (step S311). Then, the conversion result image (also called the post-conversion image) obtained in step S309 is set as the image corresponding to the result of the image conversion process based on the request received in step S301 (step S312), the conversion result to be contained in the notification is set to "success" (step S313), and the process advances to step S307. On the other hand, if the judged result in step S310 is NO, the conversion result to be notified is set to "error (or failure)" (step S314).

If the judged result in step S310 is NO, the job information in the cache information table provided on the storage device 109 is referred to, and the oldest conversion result image of which the reference count is "0" is deleted (step S315).

Here, in the present embodiment, the conversion result image of which the number of references is "0" is deleted. Here, since the conversion result image of which the number of references is "1" or more represents that this image is being used by some kind of components, if such the conversion result image is deleted, there is a fear that the process becomes impossible. This is the reason why the conversion result image of which the number of references is "1" or more is not deleted. Therefore, by deleting only the conversion result image of which the number of references is "0", an erroneous operation of the apparatus can be easily prevented. After then, the process advances to step S309.

Figure 4:
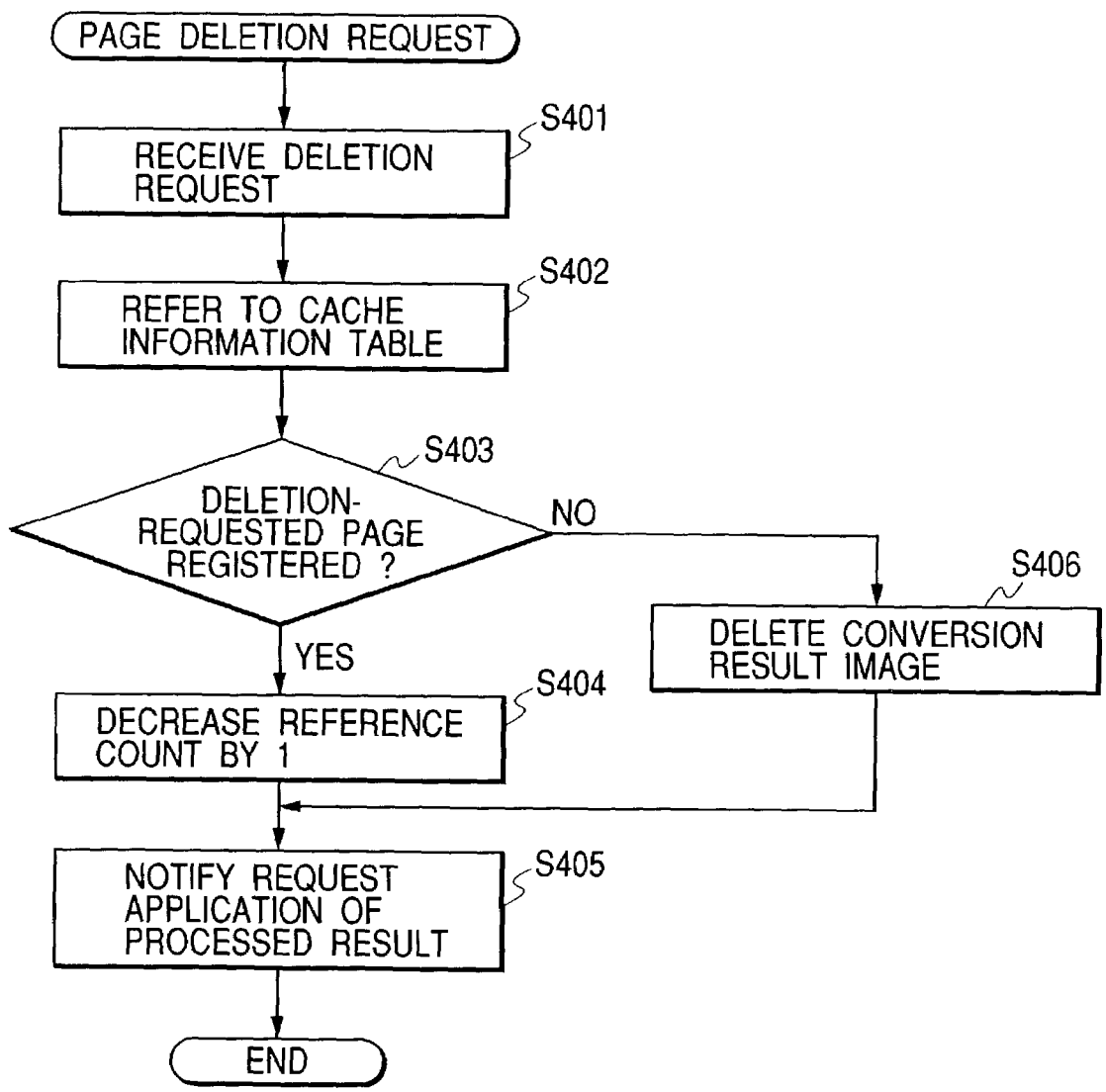
FIG. 4 is a flow chart showing a page deletion request process to be performed in step S210 of FIG. 2.

FIG. 4 is a flow chart showing the page deletion request process to be performed in step S210 of FIG. 2. Here, it should be noted that the process procedure shown in FIG. 4 is controlled by the CPU 108, and the numerals shown in FIG. 4 indicate respective steps.

First, a page deletion request is received (step S401), and the job information in the cache information table provided on the storage device 109 is referred to (step S402). Subsequently, it is judged under the control of the CPU 108 whether or not the page that deletion was requested in step S401 has been registered in the cache information table (step S403).

If the judged result in step S403 is YES, a reference count of the cache information of the corresponding page is decreased by one (step S404), the processed result of which the application that requested the deletion process is notified in step S401 (step S405), and the process ends.

On the other hand, if the judged result in step S403 is NO, the image of the page that the deletion was requested is deleted from the storage device 109 (step S406), and the process advances to step S405.

Then, by notifying the application (the request source) of the processed result, a series of the page deletion process ends.

FIGS. 5A, 5B and 5C are diagrams showing an example of the cache information table to be stored in the storage device 109. In the cache information table shown in FIG. 5B, the conversion process request information (transmission job information, former image information, and conversion parameters) which was input by the operator and the conversion result image information (a conversion job ID, and conversion result image information) which was obtained in step S309 are stored as a set of the job information shown in FIG. 5A, and further the plural sets of the job information are queued. Therefore, the former image, the conversion result image and the image conversion parameter can be uniquely specified. Moreover, the number of references is included in the job information. Here, it should be noted that the number of references is the number which represents how many times the conversion result image included in the job information was referred to. As described above, the image storing and the image deletion are performed on the basis of the number of references.

Then, FIG. 5C shows the details of the job information. In the example of FIG. 5C, the reception number=72 is included as the transmission job information. Moreover, the folder ID=120, the document ID=4 and the page ID=1 are included as the former image information. Moreover, MMR (Modified Modified READ (Relative Element ADdress)) compression, +120% enlargement and +270° rotation are included as the conversion parameters, and the image conversion ID=80030200 is included as the conversion job ID. Moreover, the folder ID=110, the document ID=1 and the page ID=1 are included as the conversion result image information, and the number=1 is included as the number of actual references.

Therefore, in step S303 of FIG. 3, it is assumed that the job information shown in FIG. 5C has been previously stored in the cache information table, and the received conversion process request indicates the folder ID=120, the document ID=4 and the page ID=1 as the former image information, and further indicates the MMR compression, the +120% enlargement and the +270° rotation as the conversion parameters. In such a case, the judged result in step S303 is given as YES. Then, in step S304, the image already held in the storage device 109 is set on the basis of the conversion result image information (the folder ID=10, the document ID=1, and the page ID=1).

In the foregoing, an example of the job information and an example of the series of processes based on the job information were explained. However, the present invention is not limited to the above examples, that is, the former image information, the conversion parameter and the like may include different information in accordance with the function and the use of the system.

As described above, in the present embodiment, the image transmission function to perform the conversion processes such as the resolution conversion, the rotation process and the like on the original image input from the scanner unit of the multifunctional device and then transmit the conversion-processed image to the external device was explained.

In the case where the image transmission function is executed, if the job information received from the transmission application and having the combination of the former image and the conversion parameter exists in the cache information table, the former image is not converted, and a notification that the former image has been converted is supplied to the transmission application. Therefore, it is possible to prevent the CPU resources and the image processing hardware being used wastefully. Thus, high-speed and effective image transmission can be achieved, whereby the performance of the image transmission increases.

Moreover, the multifunctional device according to the present embodiment is premised on the structure capable of executing the plural transmission applications such as the electronic mail transmission, the file transfer according to FTP and the like. In this case, the application (e.g., the file transfer according to FTP) of which the transmission speed is high completes the image conversion process first, whereby it is unnecessary for the application (e.g., the electronic mail transmission) of which the transmission speed is low to wait for the image conversion process for the time required to perform the actual image process. Therefore, it is possible to expect that the transmission can be performed with the performance greater than that in the case where the single application performs the transmission alone.

Moreover, in the multifunctional device according to the present embodiment, the number of references at the time of transmitting the conversion result image stored in the storage device is stored for each image in the cache information table. Then, if the conversion result image corresponding to the received former image is not stored in the storage device of the multifunctional device, it is judged whether or not the conversion result image can be newly stored in the storage device. If it is judged that the conversion result image cannot be stored in the storage device, then, on the basis of the number of references stored in the cache information table, another conversion result image, viz., the one of which the number of references is least, is deleted from the storage device, whereby the conversion result image obtained newly obtained after the conversion process was performed is stored in the storage device. By this means, the image which is frequently transmitted can be preferentially stored in the storage device, whereby high-speed and effective image transmission can be achieved, and thus the performance of the image transmission further increases.

Moreover, in the case where the page deletion request is received by the image conversion unit and the information used to specify the conversion result image corresponding to the received page deletion request has been stored in the cache information table, the corresponding conversion result image is not deleted, and the number of references to the corresponding conversion result image is decreased. By this means, the conversion result image with high possibility to be transmitted again can be held or maintained, whereby high-speed and effective image transmission can be achieved, and thus the performance of the image transmission further increases.

Second Embodiment

In the digital multifunctional device which was explained in the first embodiment, the image read by the scanner unit can be transmitted from the transmission I/F to various devices through the Internet or the like, an intranet or the telephone line. Moreover, since the digital multifunctional device can simultaneously execute the plural transmission applications, a so-called broadcast transmission function (or a multicasting function) to simultaneously transmit a single image to the plural destinations can be achieved. For example, while one image read by the scanner unit is being transmitted to the plural destinations by the fax transmission or the electronic mail transmission, this image also can be stored in the file server connected through the LAN. At the same time, of course, this image can be printed on a recording medium such as paper, sheet or the like.

In the second embodiment, a case where the present invention is applied to the broadcast transmission function which is executed by the digital multifunctional device will be explained.

Figure 6:
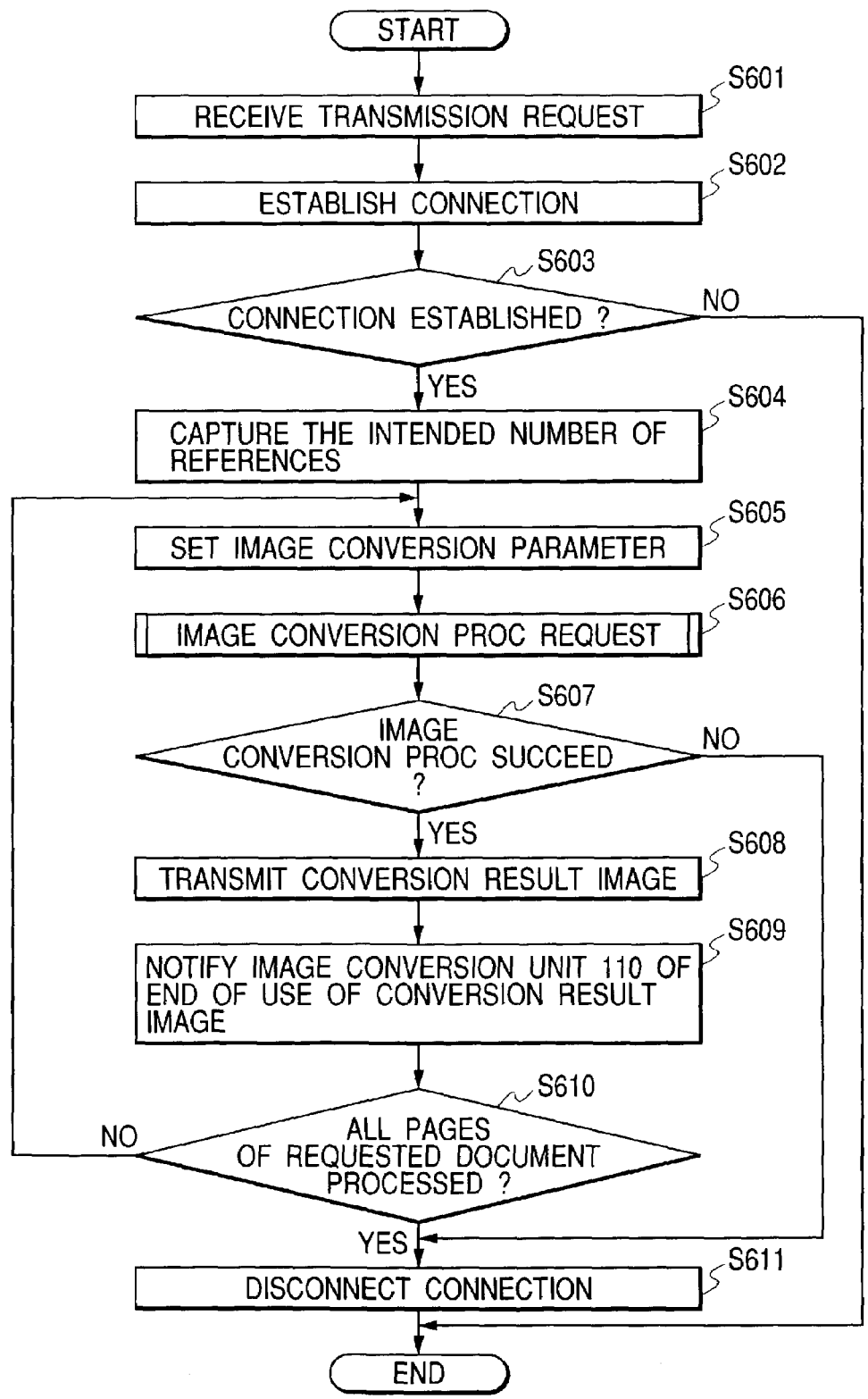
FIG. 6 is a flow chart showing a transmission process of one transmission application according to the second embodiment of the present invention.

FIG. 6 is a flow chart showing a transmission process of one transmission application according to the second embodiment of the present invention. Here, it should be noted that the process procedure shown in FIG. 6 is controlled by the CPU 108, and the numerals shown in FIG. 6 indicate respective steps.

First, the original which has been set on the scanner unit 104 by the operator is read, or the document which has been already stored in the storage device 109 is designated from the operation unit 105 by the operator. Thus, the former image to be transmitted is established. Then, the CPU 108 receives a transmission request which is to transmit the former image to the transmission destination selected on the operation unit 105 (step S601).

Then, in accordance with the transmission request received in step S601, communication connections with the transmission destinations are established through the transmission I/F 107 (step S602).

Next, it is judged whether or not the connection establishment process in step S602 succeeded (step S603). If the judged result in step S603 is YES, the intended number of references is captured from the transmission request received in step S601 (step S604). Here, it should be noted that the intended number of references is the same as the number of destinations to which the one original image is simultaneously transmitted. On the other hand, if the judged result in step S603 is NO, the process ends.

Next, a transmission job is generated in accordance with the transmission request received in step S601. Then, former image information to discriminate the former image, image conversion parameters necessary for the image conversion, and the intended number of references captured in step S604 are set to the transmission job as the parameters in a case of requesting the image conversion (step S605). Here, it is assumed that the image read by the scanner unit 104 is once stored in the storage device 109 and the former image information as shown in FIGS. 5A, 5B and 5CA to 5C is then added to the stored image.

Then, the CPU 108 requests or asks the image conversion unit 110 to perform the conversion process on the basis of the transmission job (step S606). Here, the image conversion unit 110 performs the process shown by the flow chart of FIG. 3. Therefore, in a case where the job information including the combination of the former image and the conversion parameters indicated by the received image conversion process request exists in the cache information table and the conversion result image has been already stored in the storage device 109, the conversion result image already held in the storage device 109 is set as the conversion result image to be notified to the CPU 108 (transmission application) of the image conversion process request source. Then, the conversion result of which the CPU 108 is to be notified, is set to "success".

Next, it is judged whether or not the conversion process requested in step S606 succeeded (step S607).

If the judged result in step S607 is YES, the obtained conversion result image is transmitted to the transmission destinations with which the communication connections have been established in step S602 (step S608), and the end of the use of the conversion result image is notified to the image conversion unit 110 (step S609). On the other hand, if the judged result in step S607 is NO, the communication connection established in step S602 is disconnected (step S611), and the process ends.

After the process in step S609 ended, it is judged whether or not the image data of all the pages of the transmission-requested document received in step S601 were transmitted (step S610). If the judged result in step S610 is NO, the process returns to step S605 to perform the process to the next page of the document. On the other hand, if the judged result in step S610 is YES, the process advances to step S611 to disconnect the communication connection established in step S602, and then the process ends.

Figure 7:
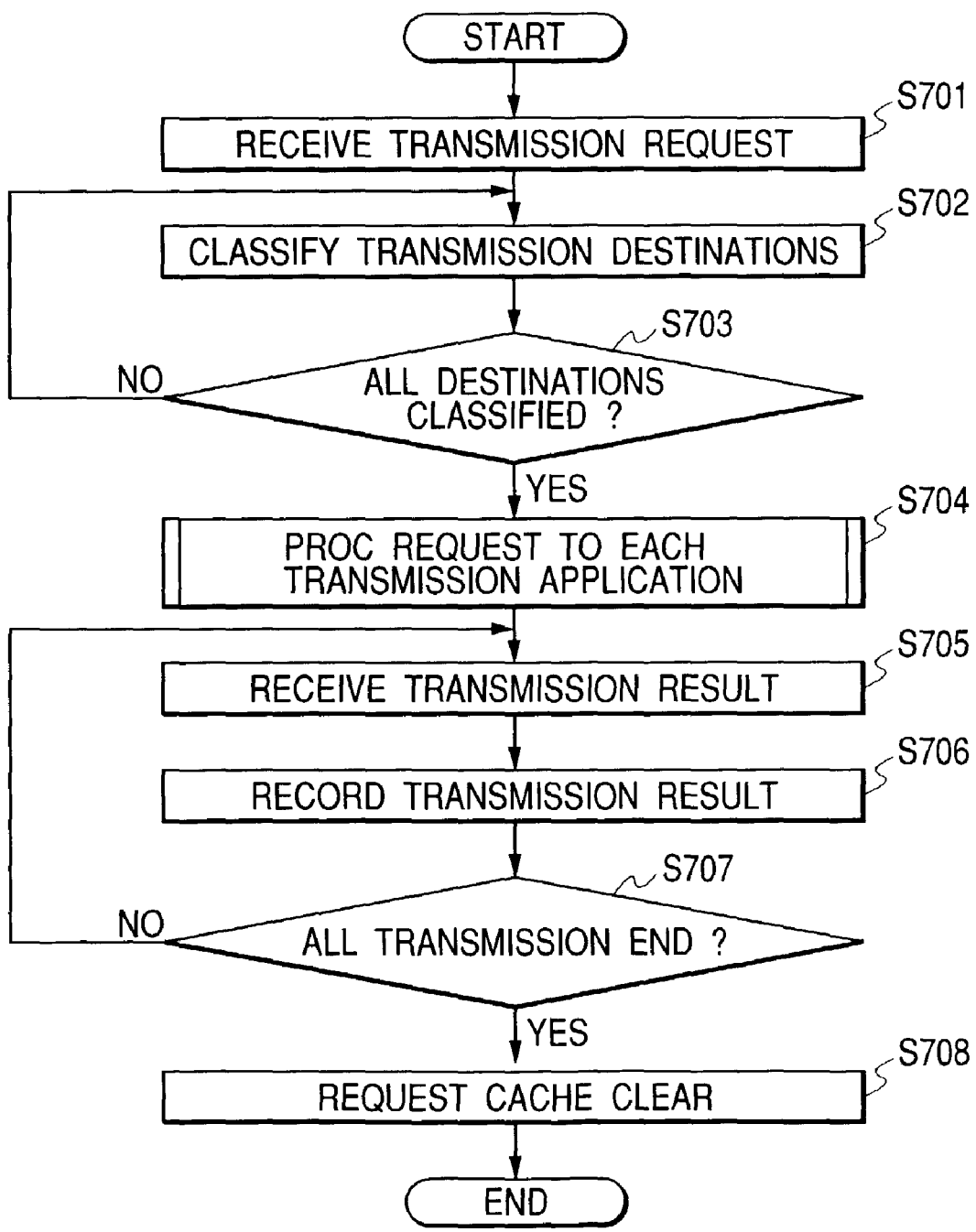
FIG. 7 is a flow chart showing a broadcast transmission process according to the second embodiment of the present invention.

FIG. 7 is a flow chart showing the broadcast transmission process according to the present embodiment. Here, it should be noted that the broadcast transmission process in the present embodiment is achieved when the plural transmission applications perform the process according to the flow chart of FIG. 6. Moreover, it should be noted that the process procedure shown in FIG. 7 is controlled by the CPU 108, and the numerals shown in FIG. 7 indicate respective steps.

First, the original which has been set on the scanner unit 104 by the operator is read, or the document which has been already stored in the storage device 109 is designated from the operation unit 105 by the operator. Thus, the former image to be transmitted is established. Then, the CPU 108 receives a broadcast transmission request which is to transmit the former image to the plural transmission destinations selected on the operation unit 105 (step S701).

Then, the transmission destinations indicated in step S701 are classified for each transmission application to be processed (step S702), and it is judged whether or not all the transmission destinations indicated in step S701 have been classified for the transmission application to be processed (step S703).

If the judged result in step S703 is NO, the process returns to step S702 to continue classifying the transmission destinations. On the other hand, if the judged result in step S703 is YES, the CPU 108 requests each transmission application to perform the transmission process to the intended transmission destination in accordance with the classification result obtained in step S702 (step S704). Here, each transmission application performs the processes in step S602 and the subsequent steps of FIG. 6 with respect to the received request.

Subsequently, the CPU 108 receives the transmission result from the transmission application (step S705), and records the received transmission result in the storage device 109 (step S706). After then, it is judged whether or not the transmission processes by all the transmission applications which were transmission-requested in step S704 end (step S707).

If the judged result in step S707 is NO, the process returns to step S705. On the other hand, if the judged result in step S707 is YES, the CPU 108 requests the image conversion unit 110 to clear the cached images (step S708), and then the broadcast transmission process ends.

Next, a case where the broadcast transmission process based on the flow charts shown in FIGS. 6 and 7 is performed in a network system shown in FIG. 8 will be explained.

Figure 8:
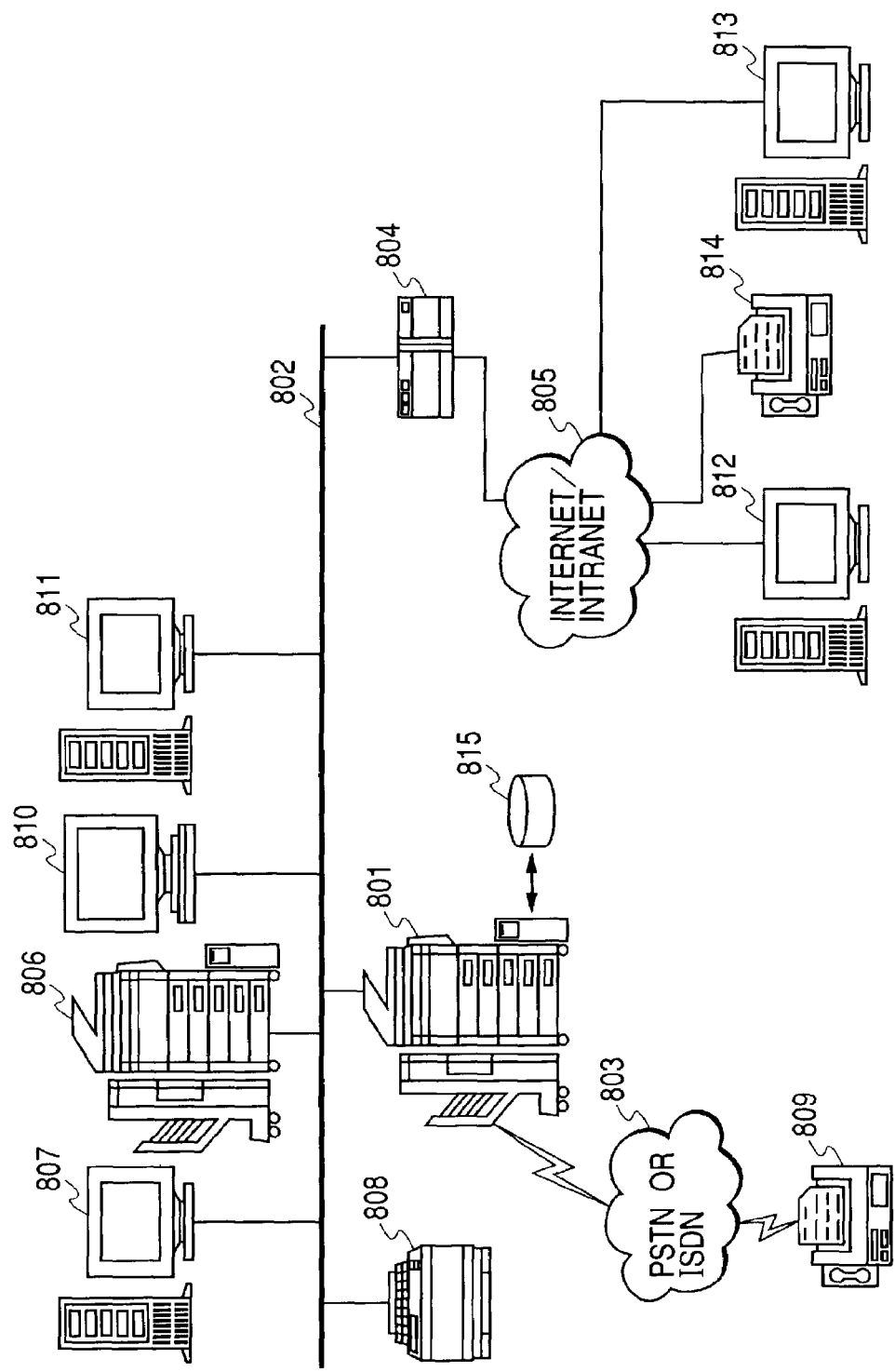
FIG. 8 is a diagram showing a network system which can perform image transmission according to the first and second embodiments of the present invention.

In the network system of FIG. 8, numeral 801 denotes a digital multifunctional device which can perform the image transmission process according to the first embodiment and the present embodiment. Here, the digital multifunctional device 801 can communicate with other devices through a LAN 802, a public line (PSNT (Public Switched Telephone Network) or ISDN (Integrated Services Digital Network)) 803, a router 804 and an Internet/intranet 805.

Numeral 806 denotes another digital multifunctional device which has the same structure as that of the digital multifunctional device 801. Numeral 807 denotes a file server, numeral 808 denotes a printer, numeral 809 denotes a fax machine, numeral 810 denotes a client PC, and numeral 811 denotes the electronic mail server. Besides, numerals 812 and 813 respectively denote a file server and an electronic mail server both connected to the network through the Internet/intranet 805. Numeral 814 denotes an Internet fax (called an I-FAX hereinafter) machine also connected to the network through the Internet/intranet 805, and numeral 815 denotes a box directly connected to the digital multifunctional device 801 to store various image data.

In the present embodiment, the digital multifunctional device 801 performs the broadcast transmission of the former image read by the scanner unit 104 and once stored in the storage device 110, to the four destinations, i.e., the I-FAX machine 814, the file server 807, the client PC 810, and the electronic mail server 811.

Then, the CPU 108 allocates the transmission request to each of following first, second, third and fourth transmission applications. Thus, each transmission application executes the transmission job on the basis of the allocated transmission request.

(1) First Transmission Application

The first transmission application is requested by the allocated transmission request to perform I-FAX transmission. That is, the first transmission application executes an I-FAX transmission job to perform the I-FAX transmission of the conversion result image obtained by performing the MMR compression process and the +120% enlargement process on the former image, to the fax machine 809 through the public line (PSNT or ISDN) 803.

(2) Second Transmission Application

The second transmission application is requested by the allocated transmission request to perform file transfer (to the file server). That is, the second transmission application executes a file transfer job to perform the file transfer with respect to the conversion result image obtained by performing the MMR compression process and the +90° rotation process on the former image, to the file server 807 through the LAN 802.

(3) Third Transmission Application

The third transmission application is requested by the allocated transmission request to perform file transfer (to the PC). That is, the third transmission application executes the file transfer job to perform the file transfer with respect to the conversion result image obtained by performing the MMR compression process and the +90° rotation process on the former image, to the client PC 810 through the LAN 802.

(4) Fourth Transmission Application

The fourth transmission application is requested by the allocated transmission request to perform mail transmission. That is, the fourth transmission application executes an electronic mail transmission job to perform the electronic mail transmission of the conversion result image obtained by performing the MMR compression process and the +90° rotation process on the former image, to the mail server 813 through the Internet/intranet 805.

Here, it should be noted that the transmission process of FIG. 6 according to the request in the step S704 is performed in the order of first, second, third and fourth transmission applications. Therefore, the job information is stored in the cache information table so that the information of an I-FAX transmission job 901, the information of a file transfer job (to the file server) 902, the information of a file transfer job (to the PC) 903, and the information of a mail transmission job 904 are stored in due order.

FIG. 9, which is composed of FIGS. 9A and 9B, is a diagram showing a state of the cache information table at a time when, among the above four jobs, the I-FAX transmission job 901, the file transfer job (to the file server) 902 and the file transfer job (to the PC) 903 were executed in due order (i.e., the mail transmission job 904 is not yet executed).

As shown in FIG. 9, the job information of the I-FAX transmission job 901 executed by the first transmission application and the conversion result image based on the I-FAX transmission job 901 are stored in the storage device 109.

Next, the job information of the file transfer job (to the file server) 902 executed by the second transmission application and the conversion result image based on the file transfer job 902 are stored in the storage device 109. Here, the former image information of the file transfer job (to the file server) 902 coincides with the former image information of the I-FAX transmission job 901, but the conversion parameters of these jobs do not coincide with each other. For this reason, when the second transmission application executes the file transfer job (to the file server) 902, the second transmission application also transmits a newly generated conversion result image 2. Therefore, when the file transfer job (to the file server) 902 is executed, the image conversion unit 110 performs the MMR compression process and the +90° rotation process on the former image.

Then, the job information of the file transfer job (to the PC) 903 executed by the third transmission application and the conversion result image based on the file transfer job 903 are stored in the storage device 109. Here, the former image information and the conversion parameter of the file transfer job (to the PC) 903 respectively coincide with the former image information and the conversion parameter of the file transfer job (for the file server) 902. For this reason, when the third transmission application executes the file transfer job (to the PC) 903, the third transmission application retransmits the conversion result image 2 already transmitted with respect to the file transfer job (to the file server) 902. Therefore, when the file transfer job (to the PC) 903 is executed, the image conversion unit 110 does not perform the MMR compression process and the +90° rotation process on the former image.

Then, with respect to the mail transmission job 904 which is intended to be executed hereafter by the fourth transmission application, the former image information and the conversion parameter of the mail transmission job 904 respectively coincide with the former image information and the conversion parameter of the file transfer job (for the PC) 903. Therefore, when the fourth transmission application executes the mail transmission job, the fourth transmission application retransmits the stored conversion result image 2.

As described above, in the above example, if the broadcast transmission process according to the flow charts shown in FIGS. 5A, 5B and 5C and 6 is performed, the image conversion process which should be performed in total four times for each transmission job only has to be performed two times. That is, since a redundant image conversion process is not performed, speeding up of the broadcast transmission process can be achieved. Besides, the storage area which is necessary to store the conversion result images can be reduced.

Incidentally, it should be noted that the broadcast transmission process to which the present invention is applicable is not limited to the process which is based on the combination and the order of the transmission applications as in the above example. For example, the broadcast transmission process to which the present invention is applicable may include broadcast transmission to the other digital multi-functional device 806, the fax machine 809 and the like.

Moreover, it is needless to say that the present invention is applicable to a simultaneous multi-functional process in which the broadcast transmission process, the data storage process to the box 815, a copying process by the own device, and a printing process by the printer 808 are appropriately combined.

As explained above, according to the present embodiment, the present invention is applied to the broadcast transmission to the plural destinations on the system, and each transmission application performs the transmission of the stored conversion result image to the communication partner in the case where the former image information and the conversion parameter of the already-executed transmission job stored in the cache information table respectively coincide with the former image information and the conversion parameter of the next transmission job.

Thus, since the one conversion result image can be transmitted to the plural destinations, it becomes unnecessary to perform useless conversion processes and also it is possible to reduce the capacity of the storage area necessary for the broadcast transmission. Therefore, the high-speed and efficient broadcast transmission process can be achieved.

Other Embodiments

In the above embodiments, the case where the image transmission function is executed was explained in detail. However, the present invention is not limited to the above case, that is, the present invention is applicable to a case where the fax function, the copying function or the printer function is executed, and also to a case where the combination of these functions is executed. Here, it should be noted that, in each of these cases, the above transmission application is replaced by the application for controlling each of the above functions.

Moreover, the conversion process to which the present invention is applicable is not limited to the processes described in the above embodiments, that is, the present invention is also applicable to other conversion processes such as a color conversion process, a gamma conversion process, a binary/multi-value conversion process, a trimming process, a masking process and the like. Moreover, the protocol used in the file transmission is not limited to the FTP, that is, other protocols such as an SMB (Server Message Block) transmission protocol, a NetWare transmission protocol and the like can be used.

Moreover, in the above embodiments, the digital multifunctional device was explained as the image processing apparatus by way of example. However, the present invention is not limited to this, that is, it is needless to say that the present invention is also applicable to other devices such as the fax machine and the like.

Moreover, the operator may execute a part of the control of each function control by the application. For example, the operator may input the parameters or the like to issue the image conversion process request, and the image conversion unit may receive the notification based on the issued image conversion process request. In this case, although the operator directly handles and controls the image conversion process in detail, since the image conversion unit does not perform any useless image conversion process as described above, it is unnecessary for the operator to input the setting and the like necessary for the image conversion process from the operation unit many times, whereby ease and convenience of use improve.

Incidentally, it is needless to say that the present invention is achieved in a case where a storage medium storing the program codes of software for achieving the functions of the above embodiments is supplied to a system or an apparatus and then a computer (or CPU or MPU (MicroProcessor Unit)) in the system or the apparatus reads and executes the program codes stored in a storage medium (e.g., the storage device 109 in the above embodiments).

In this case, the program codes themselves read from the storage medium achieve the functions of the above embodiments, whereby the storage medium storing such the program codes constitutes the present invention. As the storage medium from which the program codes can be supplied, for example, a floppy disk, a hard disk, an optical disk, a magnetooptical disk, a CD-ROM (Compact Disk Read-Only Memory), a CD-R (Compact Disk Recordable), a magnetic tape, a nonvolatile memory card, a ROM (Read-Only Memory), or the like can be used. Moreover, it is needless to say that the present invention includes not only the case where the functions of the above embodiments are achieved by executing the program codes read by the computer, but also a case where an OS (operating system) or the like functioning on the computer executes all the process or a part thereof according to the instructions of the program codes to achieve the functions of the above embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such program codes to achieve the functions of the above embodiments.

Although the present invention were explained with reference to the above preferred embodiments, the present invention is not limited to these embodiments but encompasses any and all modifications or combinations within the spirit and scope of the appended claims.

What is claimed is:

1. An image processing apparatus which includes conversion means for performing a predetermined conversion process on an input former image and outputting a conversion result image obtained by the conversion process, comprising:

first storage means for storing the conversion result image;

output control means for outputting the conversion result image;

determination means for determining the number of references to each conversion result image stored in said first storage means in accordance with type of output destinations, the number of references being used for the image output by said output control means;

second storage means for storing the number of references to each conversion result image stored in said first storage means determined by said determining means, said second storage means varying the number of references in accordance with outputting the conversion result image by said output controlling means;

judging means for judging whether or not the conversion result image is to be referenced in accordance with the type of the output destinations; and control means for controlling said conversion means, said first storage means and said output control means such that said output control means outputs the conversion result image stored in said first storage means without performing the conversion process on the former image in accordance with the determined number of references in a case where it is judged that the conversion result is to be referenced, and outputs the conversion result image obtained from said conversion means in a case where it is judged that the conversion result image is not to be referenced such that said first storage means invalidates the conversion result image in a case where the number of references stored in said second storage means reaches the predetermined number.

2. An image processing apparatus according to claim 1, further comprising transmission means for transmitting the conversion result image output by said output control means.

3. An image processing apparatus according to claim 2, wherein a transmission function to be executed by said transmission means includes a function to attach the conversion result image to an electronic mail and then transmit the electronic mail to which the conversion result image has been attached, and a function to transmit the conversion result image in accordance with a predetermined file transfer protocol.

4. An image processing apparatus according to claim 1, wherein said determination means determines the number of references in accordance with job information concerning the former image.

5. An image processing apparatus according to claim 4, wherein the job information includes a parameter of the conversion process and discrimination information of the former image, and the parameter is the parameter which concerns at least one of the three conversion processes of an encoding process, a resolution conversion process, and a rotation process.

6. An image processing method which performs a predetermined conversion process on an input former image and outputting a conversion result image obtained by the conversion process, comprising:
   a first storage step of storing the conversion result image in a storage means;
   an output control step of outputting the conversion result image;
   a determination step of determining the number of references to each conversion result image stored in said first storage step in accordance with type of output destinations, the number of references being used for the image output by said output control step;
   a second storage step of storing the number of references to each conversion result image stored in the storage means determined by said determining means, said second storage step varying the number of references in accordance with outputting the conversion result image by said output controlling step;
   a judging step of judging whether or not the conversion result image is to be referenced in accordance with the type of the output destinations; and
   a control step of controlling said conversion step, said first storage step and said output control step such that said output control step outputs the conversion result image stored in said first storage step without performing the conversion process on the former image in accordance with the determined number of references in a case where it is judged that the conversion result is to be referenced, and outputs the conversion result image obtained from said conversion step in a case where it is judged that the conversion result image is not to be referenced and such that said first storage step invalidates the conversion result image in a case where the number of references stored in said second storage step reaches the predetermined number.

7. A program, stored in executable form in a computer-readable storage medium, to execute an image processing method which performs a predetermined conversion process on an input former image and outputting a conversion result image obtained by the conversion process, comprising:
   a first storage step of storing the conversion result image in a storage means;
   an output control step of outputting the conversion result image;
   a determination step of determining the number of references to each conversion result image stored in the storage means in accordance with type of output destinations, the number of references being used for the image output in said output control step;
   a second storage step of storing the number of references to each conversion result image stored in the storage means determined in said determination step, said second storage step varying the number of references in accordance with outputting the conversion result image by said output controlling step;
   a judgment step of judging whether or not the conversion result image is to be referenced in accordance with the type of the output destinations; and
   a control step of controlling execution of said conversion step, said first storage step and said output control step such that said output control step includes outputting the conversion result image stored in said first storage step without performing the conversion process to the former image in accordance with the determined number of references in a case where it is judged that the conversion result is to be referenced, and outputting the conversion result image obtained from said conversion step in a case where it is judged that the conversion result image is not to be referenced and such that said first storage step invalidates the conversion result image in a case where the number of references stored in said second storage step reaches the predetermined number.

* * * * *

UNITED STATES PATENT AND TRADEMARK OFFICE
CERTIFICATE OF CORRECTION

PATENT NO.       : 7,221,469 B2                                   Page 1 of 1
APPLICATION NO. : 10/156123
DATED            : May 22, 2007
INVENTOR(S)      : Hiroyasu Morita It is certified that error appears in the above-identified patent and that said Letters Patent is hereby corrected as shown below:

ON THE TITLE PAGE ITEM [56] REFERENCES CITED:

Foreign Patent Documents,
"JP 7-288631 10/1995      should read --JP 7-288631 A  *   10/1995-- and
JP 07288631 A * 10/1995"

"EP 0 949 797 A2 10/1999   should read --EP 0  949  797  A2 *  10/1999
EP 949797  A2 * 10/1999                    EP 1  022  894  A2 * 10/1999--.
EP 1 022 894 A2 7/2000
EP 1022894 A2 * 7/2000"

COLUMN 10:

Line 23, "that" should read --with respect to which--.

COLUMN 12:

Line 1, "image obtained" should read --image--.

COLUMN 18:

Line 7, "once" should read --first--; and
Line 14, "were" should read --was--.

Signed and Sealed this

Sixth Day of May, 2008

JON W. DUDAS
*Director of the United States Patent and Trademark Office*